United States Patent

[11] 3,621,882

[72] Inventor Harry P. Kupiec
 10 Dunman Way, Baltimore, Md. 21222
[21] Appl. No. 13,985
[22] Filed Feb. 25, 1970
[45] Patented Nov. 23, 1971

[54] INLINE, THROUGH-FLOW PRESSURE COMPENSATOR AND ACCUMULATOR
3 Claims, 9 Drawing Figs.
[52] U.S. Cl................................................. 138/30
[51] Int. Cl................................................. F16l 55/04
[50] Field of Search........................................ 138/26, 30;
 239/89, 96

[56] References Cited
UNITED STATES PATENTS
2,439,053 4/1948 Moore........................... 138/30 X
2,497,020 2/1950 Singer........................... 138/26
2,731,038 1/1956 Purcell.......................... 138/30
3,035,613 5/1962 Beatty.......................... 138/30
FOREIGN PATENTS
13,976 1887 Great Britain................ 138/26

Primary Examiner—Herbert F. Ross
Attorney—Samuel Levine

ABSTRACT: The pressure compensator and accumulator comprises a casing having ports at opposite ends. A hermetically sealed air chamber means of elastomeric material is loosely housed within the casing. The device is serially inserted in the flow line by connecting one port to an open end of the flow line, and connecting the adjacent open end of the flow line to the opposite port, whereby flow takes place through the casing from one port through the opposite port. Means are provided to prevent the blocking of the outlet port by the air chamber means when the means moves toward the outlet port under the influence of the flow.

PATENTED NOV 23 1971      3,621,882
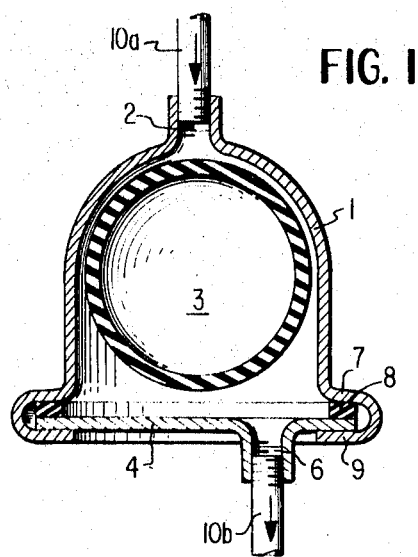
FIG. 1
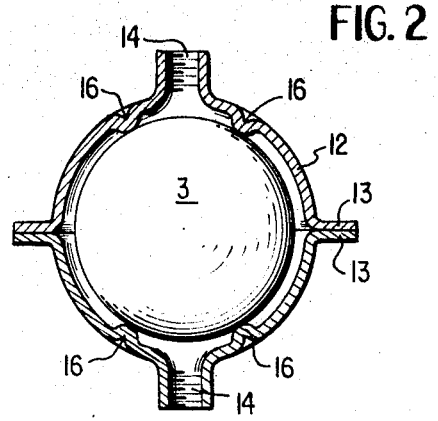
FIG. 2
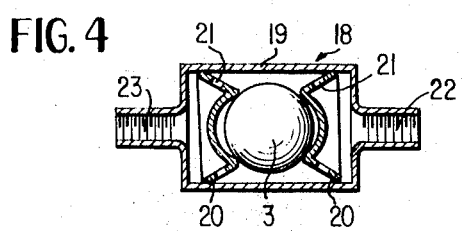
FIG. 4
FIG. 3
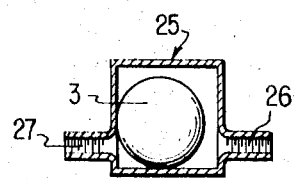
FIG. 5
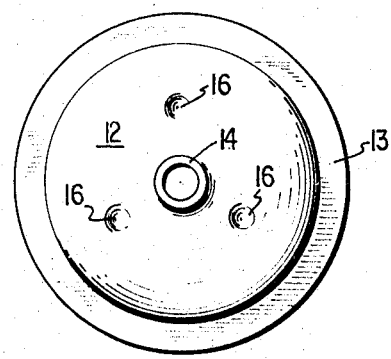
FIG. 6
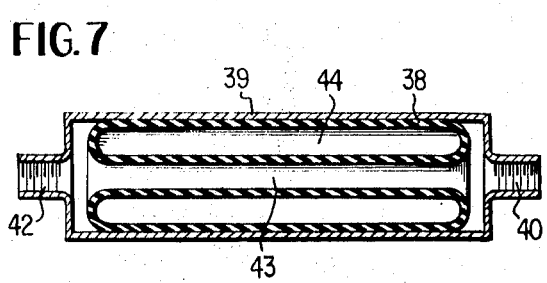
FIG. 7
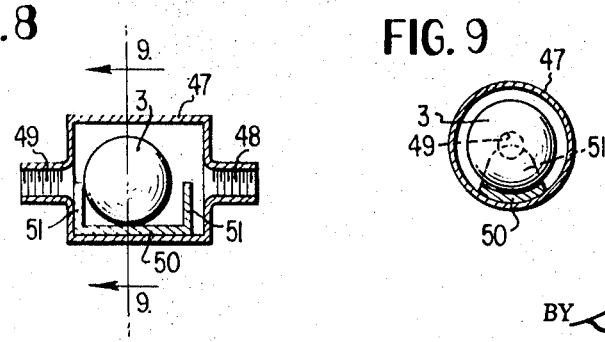
FIG. 8    FIG. 9
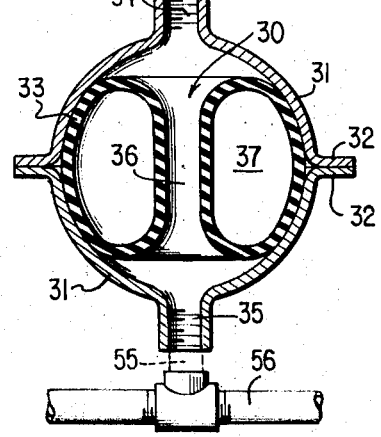
INVENTOR
HARRY P. KUPIEC
BY *Samuel Levine*
ATTORNEY

INLINE, THROUGH-FLOW PRESSURE COMPENSATOR AND ACCUMULATOR

This invention relates to expansible chamber-type pressure compensators and accumulators, particularly of the in-line, through-flow type.

Pressure compensators of the expansible chamber type are utilized in fluid systems wherein pressure and flow vary. The compensator may act as a shock absorber or dampener to absorb transient pressure pulses, and thereby obtain a more constant pressure flow, or it may be utilized to absorb water hammer or similar pressure and flow inertia effects. The device may also be used as a pressure accumulator to store fluid under pressure for subsequent utilization.

Heretofore, such pressure and flow compensating devices have been connected to the flow line by a branch line, that is, by a pipe transverse to the main flow pipe. Conventionally, the pressure or flow compensator has a single port which serves as an inlet and an outlet. This port connects the device to the branch pipe and thereby to the flow in the main flow line.

The branch or transverse-type connecting system between the main flow line and the pressure and flow-compensating device requires a certain amount of head space around the flow pipe, the space depending upon the length of the branch pipe which is generally perpendicular to the main flow pipe, and the overall size of the compensator which is attached to the outer end of the branch pipe. In many installations such space is not available, or at a premium. For example, in aircraft where space is limited, the fuel pipes pass through tunnels or similar enclosed space with very little surrounding space. Connecting pressure and flow compensators to flow lines in such limited space is difficult and requires modifications of the enclosing tunnel walls to house and charge the pressure compensators. The same problems also appear in locations wherein the pipes are located too close to ceilings, walls and similar parts of a structure.

An object of this invention is to provide a pressure or flow compensator which can be connected in the flow line so that the entire fluid flows therethrough.

Another object is to provide a pressure or flow compensator which is in-line that is, serially inserted in the flow line, whereby the overall space requirement for installing the compensator in the flow line is that of the cross-sectional dimension of the compensator which is transverse to the axis of the flow line.

Another object of this invention is to provide a pressure compensator wherein the pressure variations or shocks are absorbed by a hermetically sealed air chamber means having walls comprising resilient and flexible material, such as rubber, plastic, thin metal bellows material, or the like. The chamber may be in the form of a hollow sphere, or of toroidal shape, and loosely housed in a metal casing having an end inlet port and an oppositely located end outlet port for connecting the device into a flow line.

A further object is to provide an in-line through-flow pressure compensator as described above with means for preventing the movable air chamber means from blocking the outlet port when the chamber means is moved under the influence of the flowing fluid toward the outlet.

Further objects and advantages will be apparent from the following description and accompanying drawings wherein:

FIG. 1 is a cross-sectional view of the in-line through-flow pressure or flow compensator, and illustrating one embodiment of the invention;

FIG. 2 is a cross-sectional view of another embodiment;

FIG. 3 is a plan view of the embodiment of FIG. 2;

FIGS. 4 and 5 are other forms of compensators embodying the concept of the invention;

FIGS. 6 and 7 illustrate embodiments wherein the air chamber means is a torus;

FIG. 8 illustrates a further modification; and

FIG. 9 is a cross-sectional view taken along line 9—9 of FIG. 2.

The in-line through-flow pressure or flow compensator illustrated in FIG. 1 comprises a casing 1 having an inlet port 2. An expansible chamber means in the form of a hollow sphere 3, made of elastomeric material, is loosely enclosed in the casing. The air within hollow sphere 3 may be under superatmospheric or atmospheric pressure, the choice of the interior pressure depending upon the various pressure and flow parameters encountered in the particular installation. While the expansible chamber means is disclosed as being of spherical shape it may assume other shapes such as toroidal, elliptical and others. It may also comprise bellows formation made of metal or elastomeric material.

The casing with sphere 3 therein is closed by a closure plate 4 having an outlet port 6. The casing is flared out at its open end to form a seat 7 for sealing gasket 8, and the open end is swaged over at 9 to retain closure 4 and gasket 8 in pressure sealing relation with seat 7.

Outlet 6 is located near the periphery of closure plate 4, whereby it cannot be blocked by sphere 3 when the sphere is forced by the flow to contact closure plate 4. In the embodiment of FIG. 1, the outlet port must be offset or offcentered with respect to the center of the sphere to prevent closure of the outlet thereby.

In operation, inlet port 2 is connected to an open end of a flow line 10a. Outlet 6 is connected to the adjacent open end of flow line 10b, lines 10a and 10b constituting a single-flow line. Thus, the device is connected serially in flow line 10a–10, and not to the flow line by a branch line, as in the prior art.

Such in-line, through-flow connection lessens installation space requirements. The necessary space is determined by the transverse dimension of the casing 1 in the region of closure plate 4. The use of the closed air chamber 3 within the housing also eliminates charging of the air chamber, which is necessary in the prior art compensators, and thereby eliminate the necessary space requirement for access to the charging port and valve.

FIGS. 2 and 3 disclose another embodiment wherein the casing is made up of two similar half-shells 12 having mating flanges 13. Each shell 12 may be fabricated by drawing suitable metal in substantial semispherical shape. Then elastomeric chamber 3 is inserted and both halves of the casing are joined together at their flanges 13 by cementing, welding, or by any other means to insure a proper pressure sealing joint.

Each shell 13 is provided with a port 14 at its apex, which port may serve as an inlet or outlet. To prevent sphere 3 from blocking a port 14, dimples or deformations 16 are formed in one or both shells 12, and spaced around a port 14, as illustrated in FIG. 3.

It should be noted that sphere 3 is spaced between shells 12 to provide a sufficient flow path and still provide a large expansible chamber within the casing formed by shells 12. This forms a compact but large capacity pressure compensator, occupying very little space in relation to its capacity.

In view of dimples 16 which prevent closure of the ports by the sphere, each port 14 may be an inlet or an outlet, since it cannot be blocked.

FIG. 4 discloses a pressure compensator in the form of a cylindrical casing 18 having ports 22 and 23 at its ends. Sphere 3 is housed within the casing 18 which comprises a barrel 19 and closure ends secured thereto. To prevent the sphere from moving to and closing off the ports, spiders 20 having flow passages 21 therethrough are provided between an end of the casing and the sphere, as illustrated in FIG. 4.

FIG. 4 is somewhat diagrammatic in that the casing is shown as an integral structure. In actual construction, the ends, or at least one end, carrying ports 22 and 23 would be screwed or otherwise detachably secured to barrel 19. The spiders and sphere would be inserted in the barrel 19 before its open end is closed.

If desired, only one spider may be used, but it must be located adjacent the port which serves as the outlet port of the device.

FIG. 5 discloses a pressure compensator comprising a suitable casing 25, similar to casing 18 of FIG. 4, with elastomeric hollow sphere 3 therein. Ports 26 and 27 at the ends of the casing are offcentered. Thus, sphere 3 is unable to block any of the ports 26 or 27 which serves as the outlet port. In contrast with the embodiment of FIG. 1, the embodiment of FIG. 5 may utilize any of its ports 26 and 27 as an outlet port.

In lieu of a spherical air chamber means, other shapes may be used. FIG. 6 discloses an air chamber means 30 of toroidal shape. Chamber means 30 is housed in a casing comprising two similar semispherical members 31 secured together at their flanges 32. Chamber means 30 has its other surface 33 generally spherical to complement the interior shape of the casing members 31. Ports 34 and 35 connect intermediate the flow line whereby flow takes place through the ports and interior passage 36 of toroidal chamber means 30. The chamber 37 within the chamber means 30 may be under either atmospheric or superatmospheric pressure.

FIG. 7 illustrates an elongated elastomeric toroidal chamber means 38 within a casing 39 provided with inlet-outlet ports 40 and 42 at its ends. Ports 40 and 42 are in general alignment with passage means 43 of torus 38. Chamber 44 of chamber means 38 is under a pressure selected for the requirements of the particular installation.

The pressure compensator of FIG. 7 is suitable where space around the flow line is very limited.

FIGS. 8 and 9 illustrate a further embodiment. Elastomeric hollow sphere 3 is housed within casing 47. Inlet-outlet ports 48 and 49 are provided at the ends of casing 47. To prevent sphere 3 from blocking or closing off the ports, sphere 3 is located within a U-shaped member having a base 50 and extending sides 51. Base 50 is cross-sectionally curved to conform to the interior surface of casing 47, as illustrated in FIG. 9. Each side 51 extends to a point somewhat centrally of ports 48 and 49. Thus, as sphere 3 moves toward the outlet port, the corresponding side 51 prevents the sphere's surface from blocking the port. This is illustrated in FIG. 8 wherein port 49 is the outlet port and its adjacent side 51 stops movement of the sphere toward blocking position of the port.

Each of the above embodiments may also be connected to the flow line by a transverse branch pipe, as in the prior art. It merely involves plugging or otherwise closing off one of the two ports. For example, port 34 (FIG. 6) may be closed by a plug 54 and port 35 may be connected by a branch pipe to a T-fitting 55 inserted in the flow line 56.

It should be noted that in all embodiments the elastomeric chamber means loosely lies within the casing and is capable of limited movement therein, that is, it is not so secured to the casing by external means as to render it immovable or inflexible relative to the casing walls. While the embodiments of FIGS. 2-3, 4, 6 and 7 disclose arrangements wherein the elastomeric body is contacted by the casing walls or projections therefrom, it is merely in contact therewith and is capable of relative movement thereto. In actual practice, there would be slight clearance and tolerance between the interior of the casing and the outer surface of the elastomeric body for ease of assembly, and similar reasons.

Although several preferred embodiments of the invention have been disclosed for purpose of illustration, it is apparent that various changes and modifications may be made therein without departing from the scope and spirit of the invention.

I claim:

1. An in-line through-flow pressure compensator comprising a closed symmetrical casing having even interior surfaces, inlet and outlet port means at opposite ends, respectively, of the casing providing a flow path between ends of a flow line and thereby connect said casing serially into the flow line, a detachable, hermetically sealed, generally spherical air chamber means fitted loosely within said casing between said port means, said air chamber means formed of flexible and resilient material, said outlet port means being located offset from the axis of symmetry of said casing thereby preventing said air chamber means from seating and closing the offset outlet port means when the air chamber means is moved toward the outlet end.

2. The pressure compensator of claim 1 wherein the casing comprises a hollow body and an end closure secured thereto to form an end wall of the closed casing, said offset outlet port being located in said end closure, and wherein said air chamber means comprises a hollow sphere of elastomeric material.

3. The pressure compensator of claim 2 wherein the inlet port means at the opposite end of the casing is located offset from the axis of symmetry of said casing on the end wall of the casing opposite said end closure.

* * * * *